(12) United States Patent
Dinkel et al.

(10) Patent No.: US 6,936,935 B2
(45) Date of Patent: Aug. 30, 2005

(54) SWITCH ARRANGEMENT

(75) Inventors: Emil Dinkel, Renningen (DE); Bernd Schmidt, Wildberg-Sulz (DE); Jürgen Schrader, Weil im Schönbuch (DE)

(73) Assignee: DaimlerChrysler AG, Stuttgart (DE)

( * ) Notice: Subject to any disclaimer, the term of this patent is extended or adjusted under 35 U.S.C. 154(b) by 414 days.

(21) Appl. No.: 10/129,557

(22) PCT Filed: Aug. 1, 2001

(86) PCT No.: PCT/EP01/08874

§ 371 (c)(1),
(2), (4) Date: May 8, 2002

(87) PCT Pub. No.: WO02/12014

PCT Pub. Date: Feb. 14, 2002

(65) Prior Publication Data

US 2002/0171292 A1 Nov. 21, 2002

(30) Foreign Application Priority Data

Aug. 3, 2000 (DE) ......................................... 100 37 830

(51) Int. Cl.$^7$ ................................................. B60L 1/00
(52) U.S. Cl. ........................ 307/9.1; 307/10.1; 200/5 R
(58) Field of Search ........................ 200/5 R; 307/9.1, 307/10.1

(56) References Cited

U.S. PATENT DOCUMENTS

| | | | | |
|---|---|---|---|---|
| 4,320,573 A | * | 3/1982 | Larson | ........................ 29/622 |
| 4,491,325 A | * | 1/1985 | Bersheim | ..................... 463/38 |
| 4,619,478 A | * | 10/1986 | Heimnick et al. | .......... 296/153 |
| 4,701,629 A | | 10/1987 | Citroen | |
| 5,245,142 A | * | 9/1993 | Sacco et al. | ................. 200/5 R |
| 5,967,594 A | * | 10/1999 | Ramanujam | ................ 296/153 |
| 6,497,454 B1 | * | 12/2002 | Davidsson | ............... 297/284.3 |

FOREIGN PATENT DOCUMENTS

| | | |
|---|---|---|
| DE | 28 36 004 C2 | 3/1980 |
| DE | 28 36 004 A1 | 3/1980 |
| DE | 3933561 | 1/1991 |
| DE | 39 33 561 | 1/1991 |
| DE | 197 25 175 | 12/1998 |
| EP | 0084107 | 7/1983 |
| EP | 0 084 107 | 7/1983 |
| JP | 61-037548 | 2/1986 |
| JP | 03-167036 | 7/1991 |
| JP | 03-178839 | 8/1991 |
| JP | 03-204350 | 9/1991 |
| JP | 08-227314 | 9/1996 |
| JP | 09-109756 | 4/1997 |

* cited by examiner

Primary Examiner—Robert L. DeBeradinis
(74) Attorney, Agent, or Firm—Crowell & Moring LLP

(57) ABSTRACT

A switch arrangement for adjusting different positional parameters of a motor-vehicle seat, such as, for example, inclination of the backrest, inclination and depth of the cushion, inclination of the arm rests, etc, which can be operated in a particularly convenient and intuitively reliable manner. The switch arrangements relate the relative position of different parts of the motor-vehicle seat transversely to the longitudinal direction to the position of the control elements within a control panel. The switch arrangement can particularly advantageously be fitted at the hand-supporting end of an arm rest.

15 Claims, 3 Drawing Sheets

SWITCH ARRANGEMENT

BACKGROUND AND SUMMARY OF THE INVENTION

Figure 1:
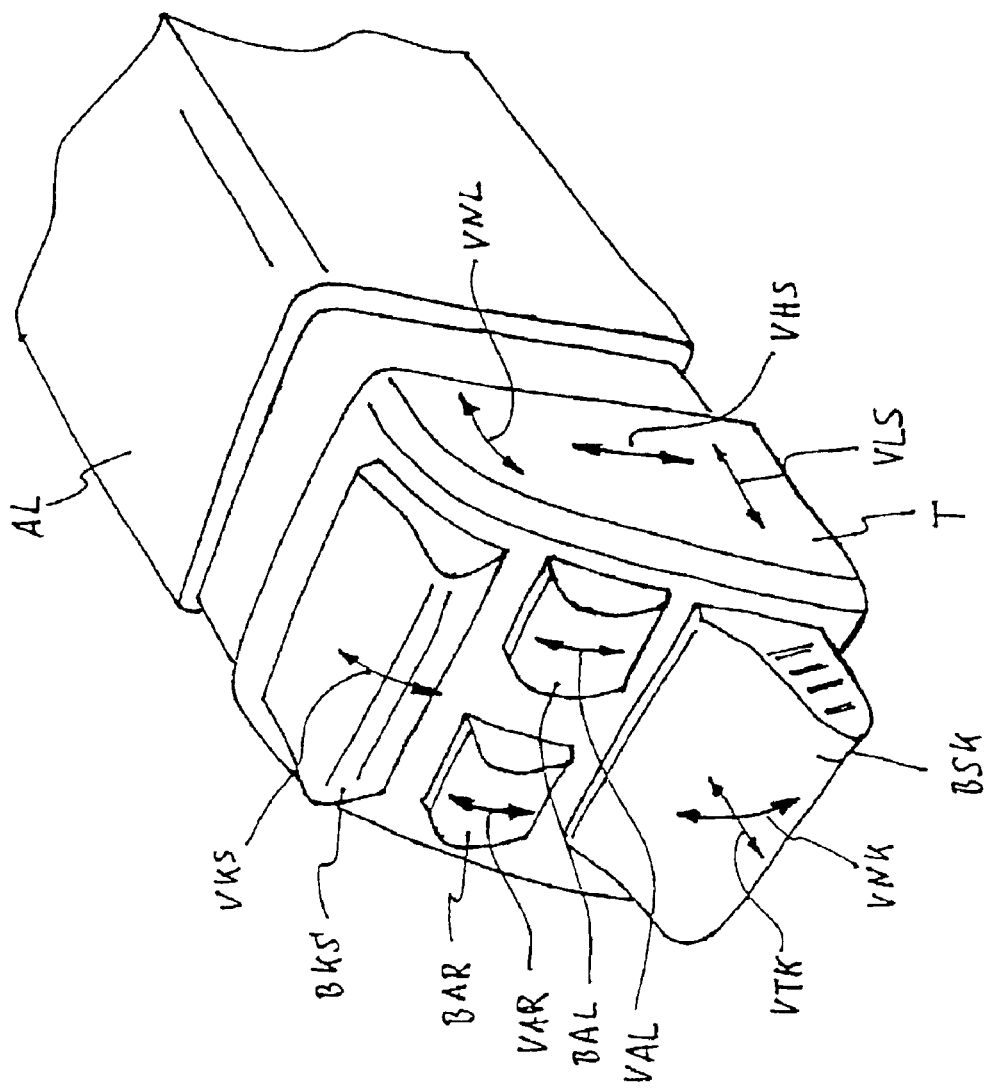

This application claims the priority of German Application No. 100 37 830.7 filed Aug. 3, 2000 and International Application No. PCT/EP01/08874 filed Aug. 1, 2001, the disclosures of which are expressly incorporated by reference herein.

The invention relates to a switch arrangement for setting positional parameters of a vehicle seat.

German Reference DE 28 36 004 C2 discloses an arrangement for adjusting a motor-vehicle seat, in which an actuating arrangement having two levers imitates the lateral profile of the motor-vehicle seat. One of the levers is designed for the backrest and is pivotable about an axis in order to adjust the inclination of the backrest, and the other actuating lever has a number of actuating options for adjusting the seat surface in accordance with the setting options thereof. German Reference DE 39 33 561 C1 discloses a control device for controlling servomotors for adjusting a motor-vehicle seat, in which the lateral profile of the motor-vehicle seat is again prescribed as a frame and within this frame a number of actuating elements are arranged at positions in the imitated frame. These positions correspond to the adjustable parts of the motor-vehicle seat, and can be actuated in a meaningful analogy to the adjustment options of the individual parts of the seat.

The object of the present invention is to specify an improved switch arrangement for setting a motor-vehicle seat.

According to the invention, two advantageous approaches for achieving the object which has been set are provided, these approaches preferably being realized together.

A first measure according to the invention makes provision for the mutual position and/or actuating direction of the plurality of control elements. These control elements are in each case assigned a different adjusting function of the vehicle seat, to imitate qualitatively, i.e. without taking over the seat geometry in a manner true to scale, the relative position and/or adjusting direction of those parts of the vehicle seat which are affected by the respective adjusting function, when looking at the vehicle seat from the front, horizontally or obliquely from above.

According to the invention seat parts are designed or arranged at least approximately symmetrically with respect to a central plane of the seat, when looking at the vehicle seat from the front. The associated control elements are designed or arranged in a manner which is symmetrical with regard to a central plane through the control panel. The switch arrangement therefore takes into consideration the geometrical division of the vehicle seat transversely with respect to the longitudinal direction of the vehicle.

It has surprisingly turned out that a spatial, three-dimensional arrangement of this type, which is different from the imitating of the side profile of the seat according to the prior art, enables an intuitively more convenient and more reliable control of the given adjusting functions of a motor-vehicle seat. The control of these functions therefore also requires less attentiveness and fewer distractions for the driver from events on the road.

The control panel with the plurality of control elements is advantageously orientated in a manner such that it faces forward in the direction of travel, so that the driver, with his forearm directed forward in a relaxed manner, can easily place his hand on the control panel and can actuate the control elements with his fingers. A convexly curved design of the control panel or the encasing surface of the group of control elements by a contour which is curved convexly towards the control side of the control panel is particularly advantageous and accommodates the relaxed posture. Fitting the switch arrangement on a forwardly directed section of the seat, for example in a front edge region of the seat cushion or, in particular, at a forwardly facing end of an arm support, is particularly favourable.

According to another advantageous approach, the plurality of control elements of the control panel are arranged on a support body which, for its part, can be displaced in at least one direction and during this displacement causes the entire vehicle seat to be adjusted in an adjusting direction which is assigned in a spatially obvious manner. An additional actuating option of this type is used, in a particularly advantageous manner, for the intuitive actuation of the switch arrangement and, in a particularly preferred manner, for the displacement of the entire seat in the longitudinal direction of the vehicle and/or for the adjustment of the seat height and/or the adjustment of the inclination of the backrest.

BRIEF DESCRIPTIONS OF THE DRAWINGS

Figure 2:
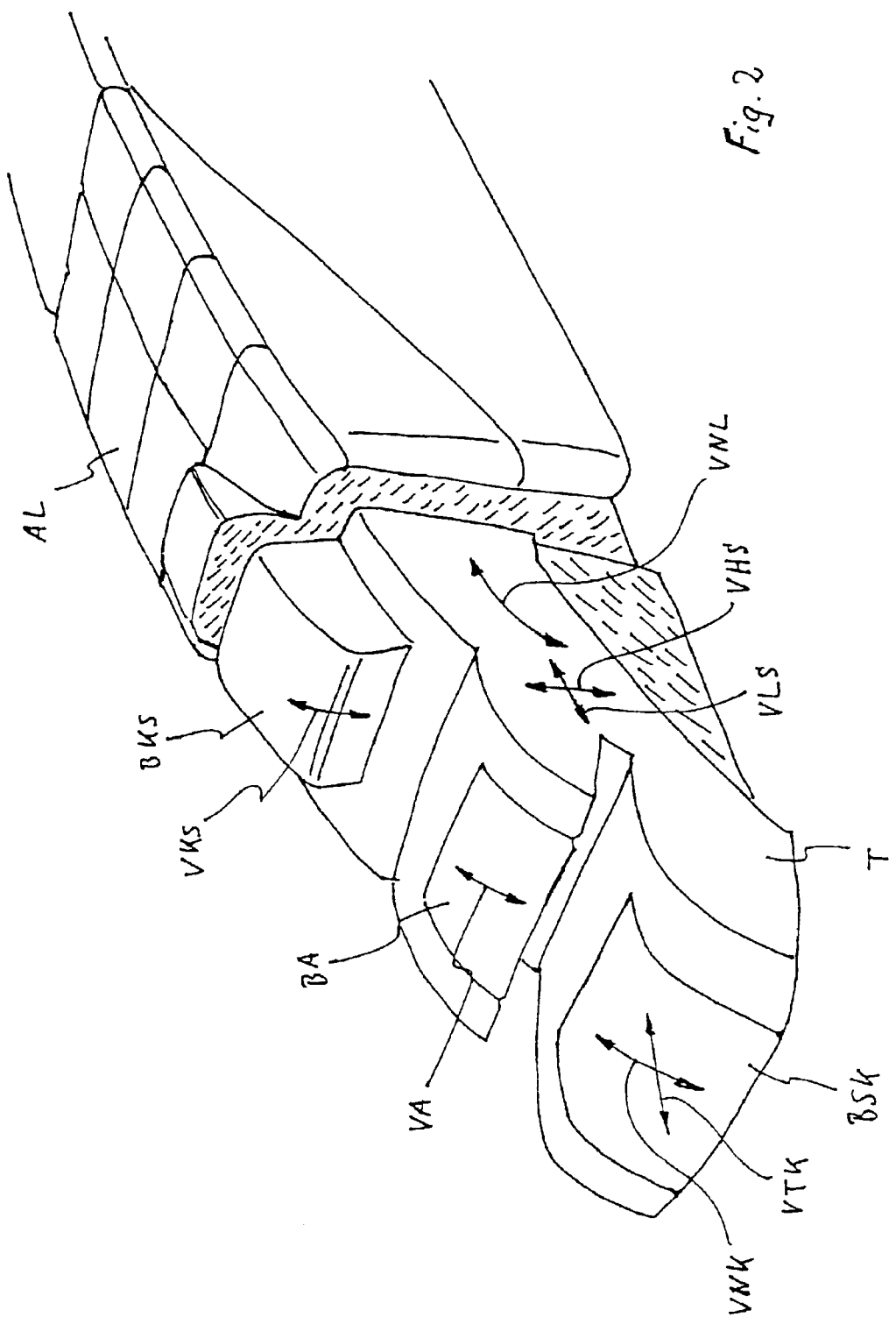
Figure 3:
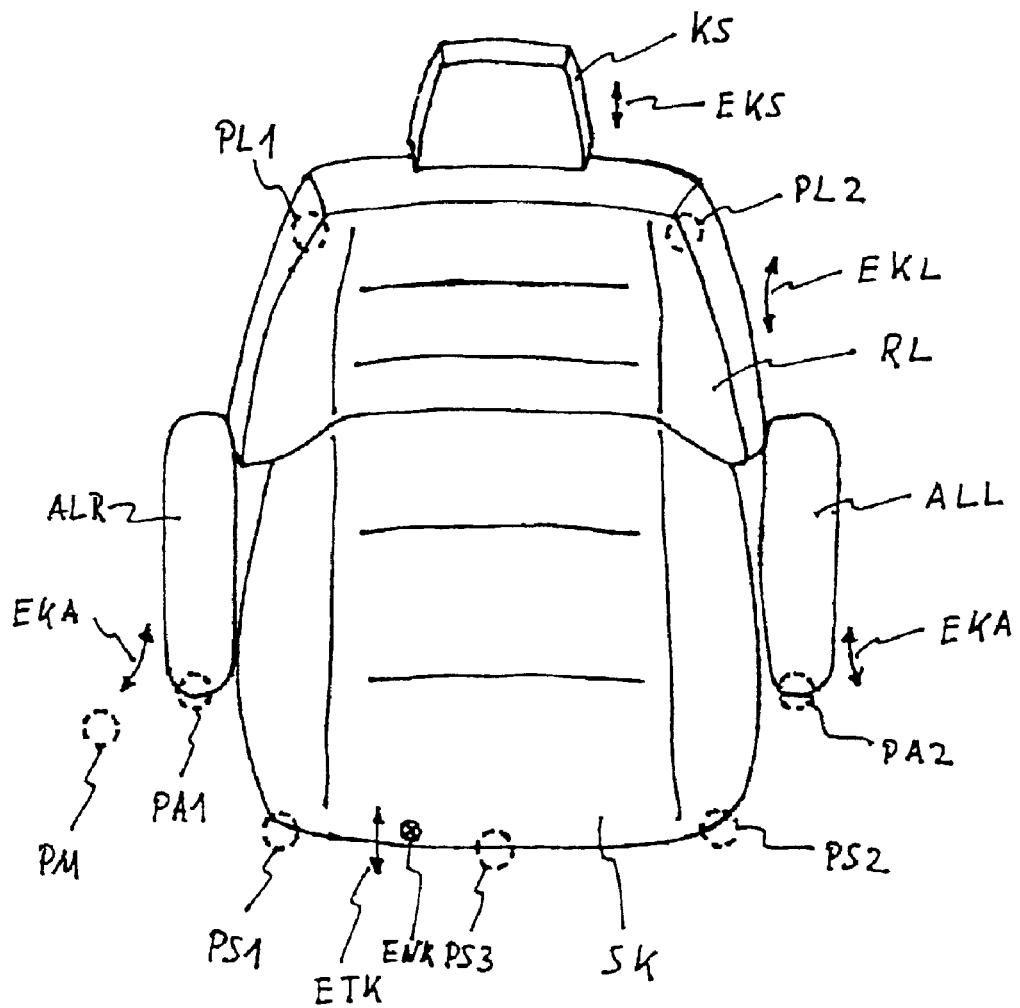

The invention is illustrated in more detail below using preferred exemplary embodiments and with reference to the figures, in which FIG. 1 shows a first embodiment of a switch arrangement, FIG. 2 shows a second embodiment of a switch arrangement, FIG. 3 shows advantageous positions for the switch arrangement according to the invention.

DETAILED DESCRIPTION OF THE PREFERRED EMBODIMENTS

FIG. 3 shows an oblique aspect of a driver's seat of a motor vehicle in the longitudinal direction of the vehicle. For further explanation of the switch arrangement according to the invention, reference is made to the relative position of the essential parts of the vehicle seat, namely a seat cushion SK, a right and a left arm rest ALR and ALL, respectively, a backrest RL and head restraint KS, it being of particular importance that, in accordance with looking in the longitudinal direction of the vehicle, the backrest is situated above the seat cushion, the head restraint is situated above the backrest, the arm rests are situated above the seat cushion and to the left and right of the seat cushion and below the head restraint. Instead of the arm rest ALL on the left, an arm rest which is integrated in a door panel may also be provided.

The head restraint KS can be adjusted in height in a direction EKS relative to the backrest RL. The backrest RL can be adjusted in inclination relative to the seat cushion or relative to the vehicle floor in the course of a pivoting movement EKL, about a bearing fitted to its lower end. The arm rests AL can be pivoted in a pivoting direction EKA running essentially perpendicular with respect to the plane of projection of FIG. 3 and, in the region of their ends on the backrest side, are mounted in horizontal pivot pins. The seat cushion SK can be displaced longitudinally in a direction ETK relative to the backrest, as a result of which the seat depth between the front edge of the seat cushion and backrest changes and, by pivoting about a horizontal axis, which is indicated by the pivoting direction ENK running essentially perpendicular with respect to the plane of projection of FIG. 3, can be adjusted in inclination. In addition, the entire seat can be displaced in its height above the vehicle floor and in its position in the longitudinal direction of the vehicle.

Advantageous positions for the fitting of a switch arrangement according to the invention are also shown in FIG. 3. The switch arrangement may, for example, be accommodated favourably in the upper region of the backrests at the positions PL1 or PL2, in the region of the front edge of the seat cushion in the centre at PS3 or laterally at PS1 or PS2, or on a central console of the vehicle at PM or, preferably, at the hand-supporting ends of the arm rests at PA1 or PA2. The switch arrangements illustrated in FIG. 1 and FIG. 2 are, for example, fitted at the ends of the arm rests at PA1 and PA2.

In the case of the switch arrangement sketched in FIG. 1, a support body T is arranged in the hand-supporting end of an arm rest AL. The support body has a plurality of control elements in a preferably convexly curved control panel which faces predominantly forward in the direction of travel of the vehicle. For example, a control element BKS for adjusting the height of the head restraint relative to the backrest can be provided in an upper region of the control panel. The control element BKS can be actuated bidirectionally in an actuating direction VKS. The actuating direction lies at least approximately in a vertical plane parallel to the longitudinal axis of the vehicle and is orientated predominantly vertically or horizontally or in a combined manner, depending on the inclination of the curvature of the control panel at this point.

A control element BSK for adjusting the seat cushion SK is arranged in the lower region of the control panel. The control element preferably has two actuating directions, which are each bidirectional, VNK in the vertical direction in order to adjust the inclination of the seat cushion and VTK in the horizontal direction in order to adjust the seat depth of the seat cushion. The vertical actuating direction VNK can be provided, in particular, by tilting the control element whereas the horizontal actuating direction is present in the form of a linear displacement of the control element. In order to move the control element out of the control panel, provision can be made, in particular, for an easy-to-grip design of the side surfaces or for a lateral cutout in the body of the control element BSK, which cutout permits the control element to be reliably gripped.

Two control elements BAR, BAL for adjusting the inclination of the arm rests are arranged vertically between the control elements BSK and BKS in the control panel, corresponding to the arrangement of the arm rests ALR and ALL in the section between the seat cushion and the head restraint, and, in an obvious imitation of the adjusting movement EKA of the arm rests, can be moved in an essentially vertical actuating direction VAR or VAL.

Instead of the vertical actuations in particular of the control elements BAR, BAL and BKS, a design of the control elements may also be provided in which the latter have a relatively large extent in the vertical direction within the control surface, with a slight projection over the control surface, and are to be actuated in each case in the direction of the control surface by pressure on the upper or lower ends.

In the example outlined, no control element is provided in the control panel for the backrest RL. Instead the setting of the inclination of the backrest in the adjusting direction EKL takes place by tilting of the support body T about a horizontal tilting axis, which is indicated by a tilting direction VNL in FIG. 1.

The support body can furthermore be displaced relative to the arm rest in a horizontal displacement direction VLS and in the process causes the entire vehicle seat to be moved in the longitudinal direction of the vehicle. Furthermore, the support body can be displaced relative to the arm rest in a vertical direction VHS and in the process causes the height of the entire vehicle seat above the vehicle floor to be adjusted.

FIG. 2 outlines a further advantageous design of a switch arrangement according to the invention which is expressed in principle merely in the special shaping of the control elements which, in the example outlined, are more closely related to the shape of a vehicle seat. The remarks with regard to the actuating options of the various control elements in the actuating directions possible in each case apply analogously to the explanations to FIG. 1. In the case of the design in FIG. 2, unlike the design according to FIG. 1, merely one actuating element BA is provided for the adjustment of the arm rests which are then adjusted simultaneously.

A multiplicity of design options are provided for the design of the support body and of the control panel and the arrangement of the control elements in detail. For example, a control element for pivoting the backrest may also be provided in the control panel, in which case, in particular in the design according to FIG. 2, for example a central control element for adjusting the inclination of the backrest can be provided instead of the central control element for the arm rests at this point, and additional control elements for the separate or connected adjustment of the arm rests are situated laterally with respect to this control element for the inclination of the backrest.

The features which are specified above and the features which can be gathered from the figures can advantageously be realized both individually and in various combinations. The invention is not restricted to the exemplary embodiments described, but can be modified in various ways within the scope of expert ability.

What is claimed is:

1. A switch arrangement for setting positional parameters of a vehicle comprising:
   a plurality of control elements assigned to adjustable parts of a vehicle seat; and
   a control panel containing said plurality of control elements wherein said plurality of control elements have position and actuating direction which relate to a respective position and adjusting direction of associated corresponding parts of the vehicle seat and wherein said position and actuating direction of a respective control element corresponds qualitatively to a relative position and a relative adjusting direction of the respectively associated parts of the vehicle seat when said vehicle seat is viewed from the front of the vehicle seat and wherein the plurality of control elements are positioned on said control panel to reproduce relative positions of said adjustable parts of said seat crosswise to a longitudinal direction of said vehicle.

2. The arrangement according to claim 1, wherein the control panel with control elements is orientated pointing forwards in a direction of travel.

3. The arrangement according to claim 1, wherein the control panel has a contour which is curved in a convex manner towards a direction of travel of the vehicle.

4. The arrangement according to claim 1, wherein the plurality of control elements are fitted at a hand-supporting end of an arm rest.

5. The arrangement according to claim 1, wherein the inclination of a seat cushion and seat depth can be set via a common control element (BSK) which can be actuated in two different directions (VTK, VNK).

6. The arrangement according to claim 1, wherein said plurality of control elements include two separate control elements (VAR, VAL) for independently setting two arm rests (ALR, ALL) are provided.

7. A switch arrangement for setting positional parameters of a vehicle comprising:
- a plurality of control elements assigned to settable parts of the vehicle seat; and
- a control panel containing said plurality of control elements wherein said plurality of control elements have at least one of position and actuating direction which relate to at least one of a position and an adjusting direction of the associated corresponding parts of the vehicle seat, wherein said plurality of control elements are arranged on a support body which is moveable in at least one direction and wherein a movement of said support body in said at least one direction causes an entirety of the vehicle seat to be adjusted in an adjusting direction assigned in a corresponding spatially obvious manner with said arrangement of control elements on said support body.

8. The arrangement according to claim 7, wherein the support body (T) is actuated in a first direction (VLS) in order to set the longitudinal position of the vehicle seat.

9. The arrangement according to claim 7, wherein the support body (T) is actuated in a second direction (VHS) in order to set the seat height.

10. The arrangement according to claim 7, wherein the support body can be actuated by tilting (VNL) about a substantially horizontal axis in order to set an inclination of the backrest (RL).

11. The arrangement according to claim 7, wherein the control panel with control elements is orientated pointing forwards in a direction of travel.

12. The arrangement according to claim 7, wherein the control panel has a contour which is curved in a convex manner towards a control side.

13. The arrangement according to claim 7, wherein the plurality of control elements are fitted at a hand-supporting end of an arm rest.

14. The arrangement according to claim 7, wherein the inclination of a seat cushion and seat depth can be set via a common control element (BSK) which can be actuated in two different directions (VTK, VNK).

15. The arrangement according to claim 7, wherein the plurality of control elements are fitted at a hand-supporting end of an arm rest.

* * * * *